C. A. GREEN.
VEHICLE BODY.
APPLICATION FILED SEPT. 17, 1913.
1,112,002.
Patented Sept. 29, 1914.
2 SHEETS—SHEET 1.
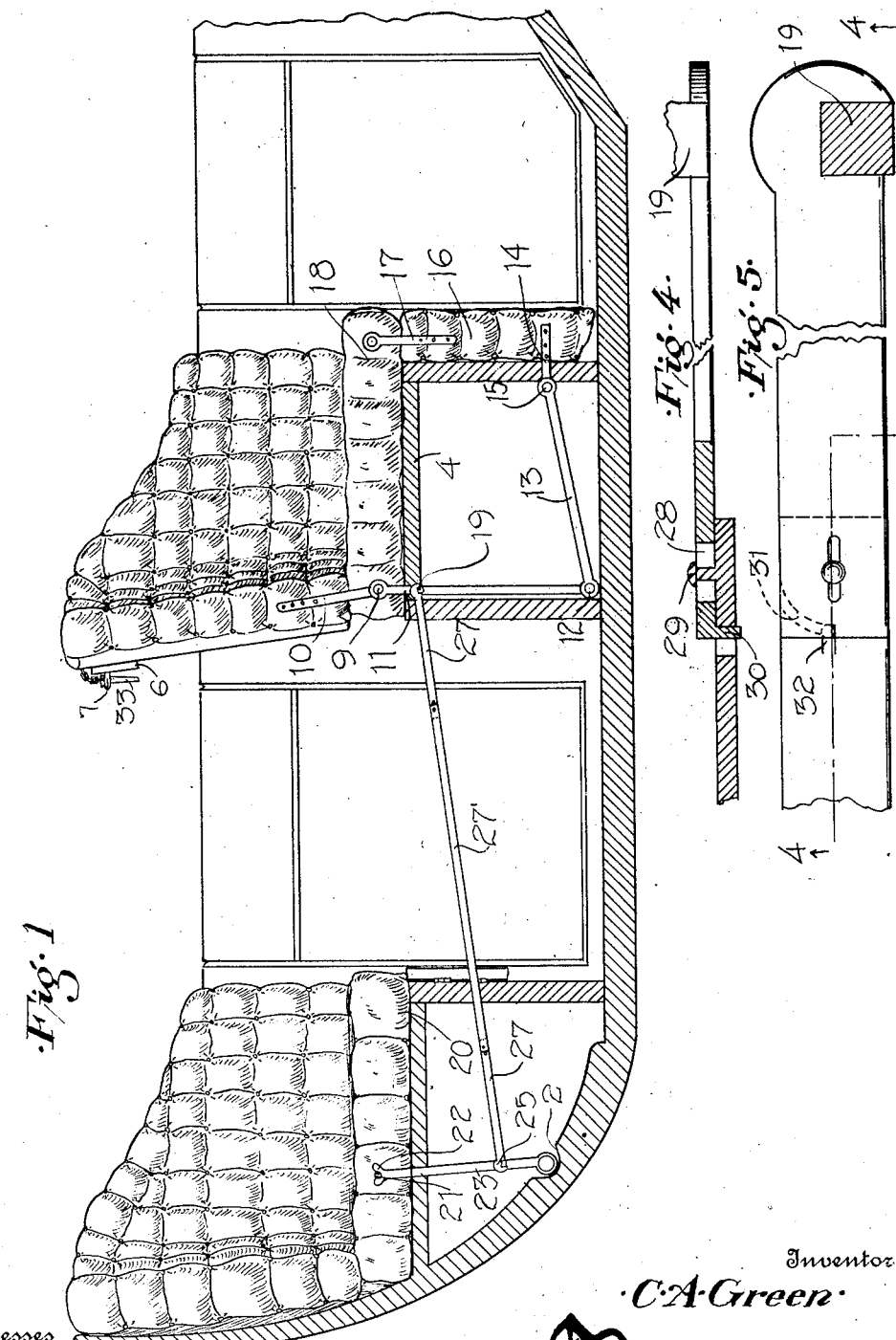

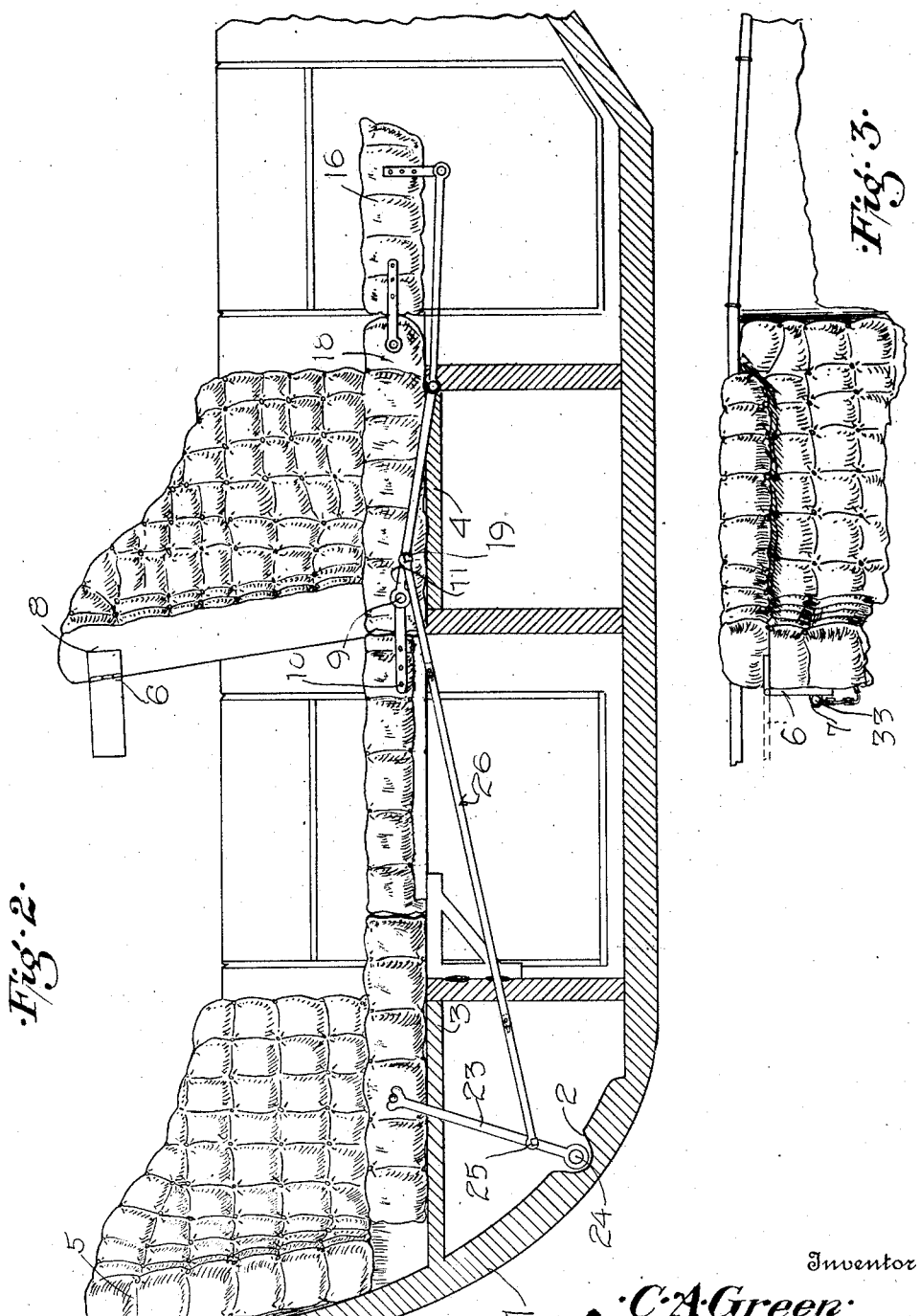

UNITED STATES PATENT OFFICE.

CHARLES A. GREEN, OF PORTLAND, OREGON.

VEHICLE-BODY.

1,112,002.  Specification of Letters Patent. Patented Sept. 29, 1914.

Application filed September 17, 1913. Serial No. 790,217.

*To all whom it may concern:*

Be it known that I, CHARLES A. GREEN, a citizen of the United States, residing at Portland, in the county of Multnomah and State of Oregon, have invented certain new and useful Improvements in Vehicle-Bodies; and I do hereby declare the following to be a full, clear, and exact description of the invention, such as will enable others skilled in the art to which it appertains to make and use the same.

This invention relates to new and useful improvements in vehicle bodies and has for its object the provision of a device which may be easily and quickly converted into a bed.

Another object of my invention is the provision of such a device wherein the seats through a novel means may be arranged in such a position to present a bed-like surface when it is so desired.

A further object of my invention is the provision of a novel means for folding said seats in the positions above referred to and thereby adapting the same for use as a bed when it is desired.

With the above and other objects in view I will now proceed to describe my invention in the following specification and accompanying drawings, in which, Figure 1 is a longitudinal sectional view of my improved automobile body showing the arrangement of the seats, levers and links in their normal positions, Fig. 2 is a view similar to Fig. 1 showing the seats in the position to be used as a bed, Fig. 3 is a plan view of a fragment of the body of my improved car showing the method of securing the back of the front seat in its normal position, Fig. 4 is a detail sectional view of the link connecting the front and rear parts, and Fig. 5 is a side view of Fig. 4.

Referring to the drawings by characters of reference 1 indicates the main body portion of my improved automobile body, having formed therein a suitable recess 2, the use of which will be more fully hereinafter described. Secured to the main body portion 1 and extending inwardly therefrom I preferably provide the seat support 3 which is adapted to hold the rear cushion in position. A similar support 4 is provided for the front seat. A suitable cushion 5 is secured to the upper portion of the body 1 and is adapted to form the back for the rear seat. Hingedly secured to the sides of the car I preferably provide the hasp 6, which is adapted to coöperate with the staple 7 carried by the back of the front seat, which is illustrated by the numeral 8. The back cushion 8 is preferably pivotally secured to the sides of the car as shown at 9, through the medium of the lever 10 which is rigidly secured to said back. This lever 10 is preferably extended, as illustrated at 11. This angular extension 11 is preferably provided at its lower extremity with a suitable pivot 12 to which is connected the link 13, the free end of said link being pivotally connected to an arm 14, as at 15. This arm 14 is secured to the front panel 16, which in turn is pivoted, through the medium of the arm 17 to the front cushion 18. A suitable lug 19 is formed on the extension 11 adjacent its upper end, and is preferably rectangular in cross section. This lug 19 is adapted to form a connection between the extension 11 and the rear operating mechanism. Slidably mounted on the rear support 3 I preferably provide the rear cushion 20, having formed at the sides thereof the suitable upstanding pins 21 which are adapted to seat in the recessed member 22, formed at the upper extremity of the arm 23. The lower end of the arm 23 is preferably pivoted in the recess 2, as at 24, and has secured intermediate its end a lug 25 which is formed in a manner similar to the lug 19.

The link, which is indicated generally by the numeral 26, is preferably formed of a plurality of sections 27 and 27′, which are provided adjacent each end with a suitable slot 28 through which the rivets 29 are adapted to extend and form a pivotal connection for the link. The ends of the links 27 are preferably extended and bent to form the lugs 30 which are adapted to extend through the slots 31 formed in the centrally located member 27 of the links. These slots 31 are preferably segmental in contour and are provided at their inner ends with the angular extensions 32 in which the lugs 30 are adapted to extend when the device is in its locked position.

It will be seen from the foregoing that when it is desired to make use of my improved automobile body the same is placed on the car in the usual manner. When the operator desires to use the same in the ordinary way the links 26 are removed from their position and folded on their several joints. The hasp 6 is turned and a suitable pin 33 is inserted through the staple 7, thus it will be seen that the back cushion 8 will be held in its normal raised position. When the operator desires to make use of the device as a bed the links 26 are connected to their respective lugs 19 and 25 and it will be clearly seen that when the forward panel 16 is raised, as illustrated in Fig. 2, the lever 10 to which the extension 11 is secured will cause the back cushion 8 of the front seat to assume a horizontal position. In this operation the link 26 will obviously cause pull on the lever 23, thus sliding the rear cushion forward and placing the same in such a position that the front ends thereof abut the ends of the front cushion of the front seat. Thus, it will appear that a substantially lateral bed-like surface will be formed which may be used for sleeping purposes. When the operator so desires the device may be thrown back in its original position and locked therein by means of the hasp previously described. The link 26 may then be removed and folded at its respective joints so that they will be out of the way of the door and when in their closed position will occupy a minimum amount of space.

While in the foregoing I have shown and described the preferred embodiment of my invention I wish it to be understood that I may change the specific arrangement and combination of parts, without in any way departing from the spirit and scope of my invention as defined in the appended claims.

What is claimed is:—

1. In combination with a vehicle body, having supports formed therein, cushions slidably mounted on said supports, said cushions being adapted to form seats, a back hingedly connected to the sides of the vehicle body and adapted to form the back for the front seat, a panel hingedly secured to the sides at the forward end of the front seat, a lever connected to the front panel, a lever connected to the front cushion forming the back of the front seat, a link connecting the front panel with the second mentioned lever, a lever operatively connected to the rear cushion of the rear seat, and adjustable links connecting the rear lever and the front lever, said levers and links being adapted to cause the cushions to assume a bed-like position.

2. In combination with a vehicle body having supports formed therein, cushions slidably mounted on said supports, said cushions being adapted to form seats, a back pivotally secured to the sides of the vehicle body adjacent the forward support, a panel pivotally secured to the sides adjacent the front edge of the front support, a lever secured to the back, said lever extending downwardly and terminating in a pivotal connection, a link secured to the pivotal connection and the front panel, a lever pivotally connected with the rear seat, and links adapted to connect the first mentioned and second mentioned levers, thereby causing the whole to assume a bed like position.

In testimony whereof I affix my signature in presence of two witnesses.

CHARLES A. GREEN.

Witnesses:
N. G. HEDIN,
GEO. L. MASTEN.